May 5, 1964 R. J. EMINGER 3,131,465
SHROUD LOADING APPARATUS
Filed April 16, 1962 5 Sheets-Sheet 1

Inventor:
Robert J. Eminger,
by Hood, Gust & Irish
Attorneys.

May 5, 1964   R. J. EMINGER   3,131,465
SHROUD LOADING APPARATUS
Filed April 16, 1962   5 Sheets-Sheet 2
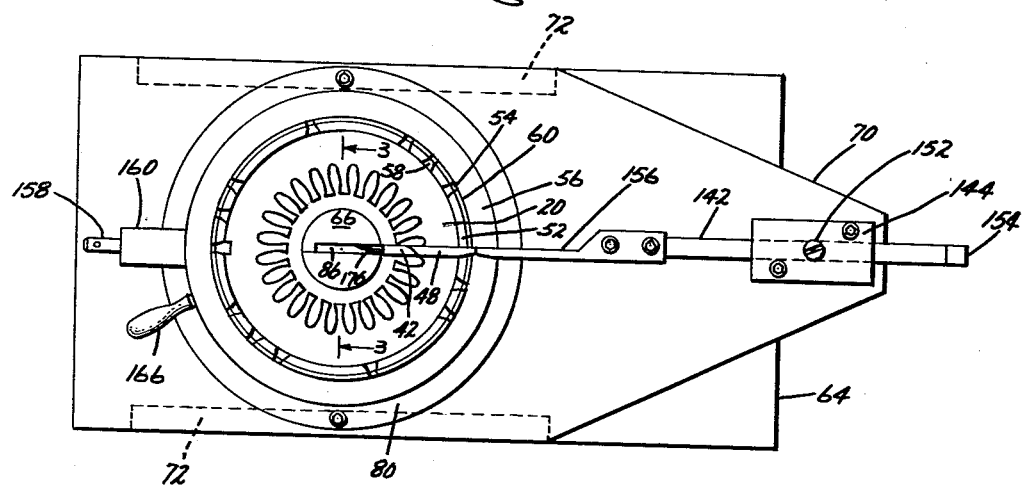
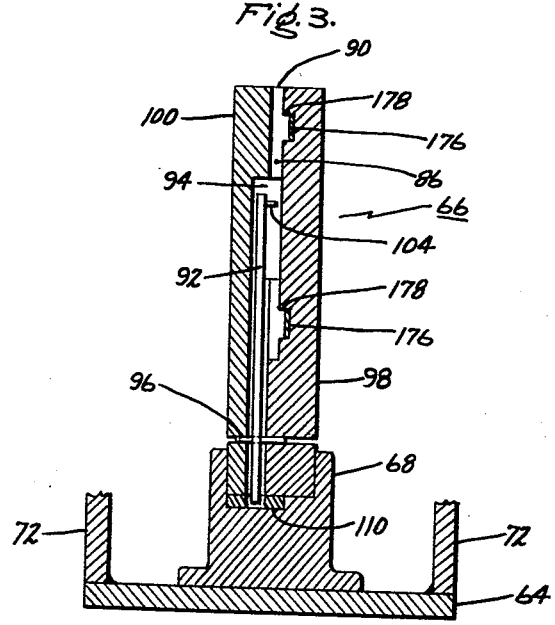
Inventor:
Robert J. Eminger,
by Hood, Gust & Irish
Attorneys.

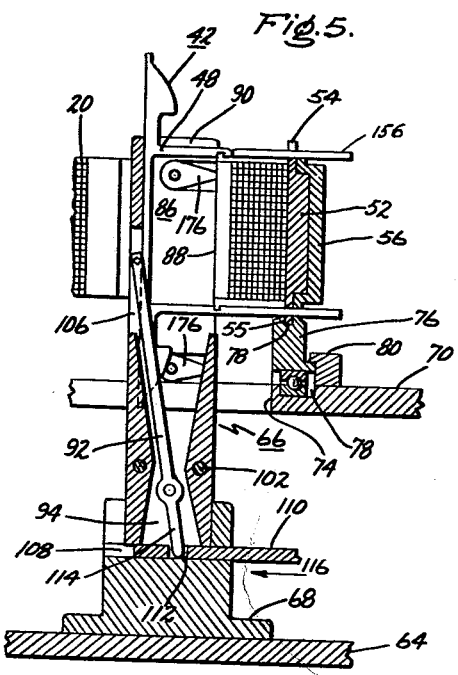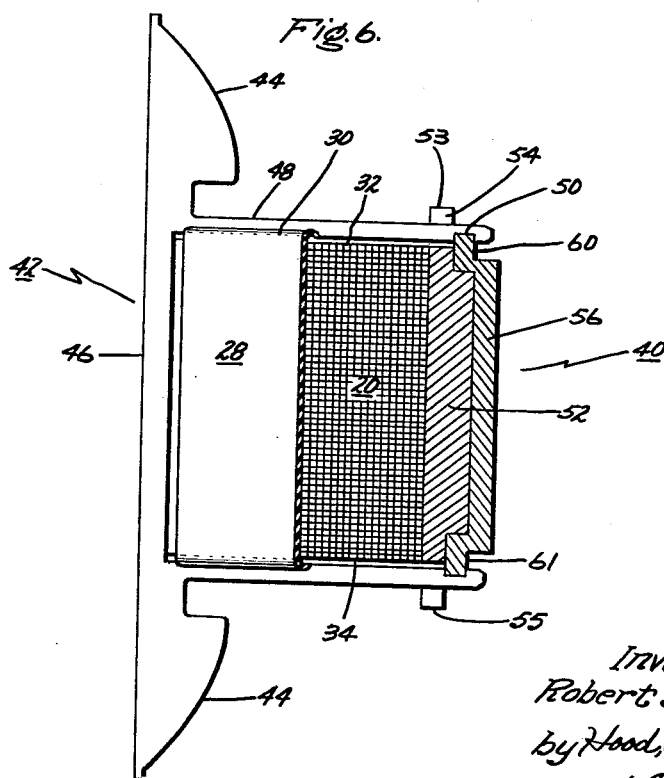

May 5, 1964 R. J. EMINGER 3,131,465
SHROUD LOADING APPARATUS
Filed April 16, 1962 5 Sheets-Sheet 4
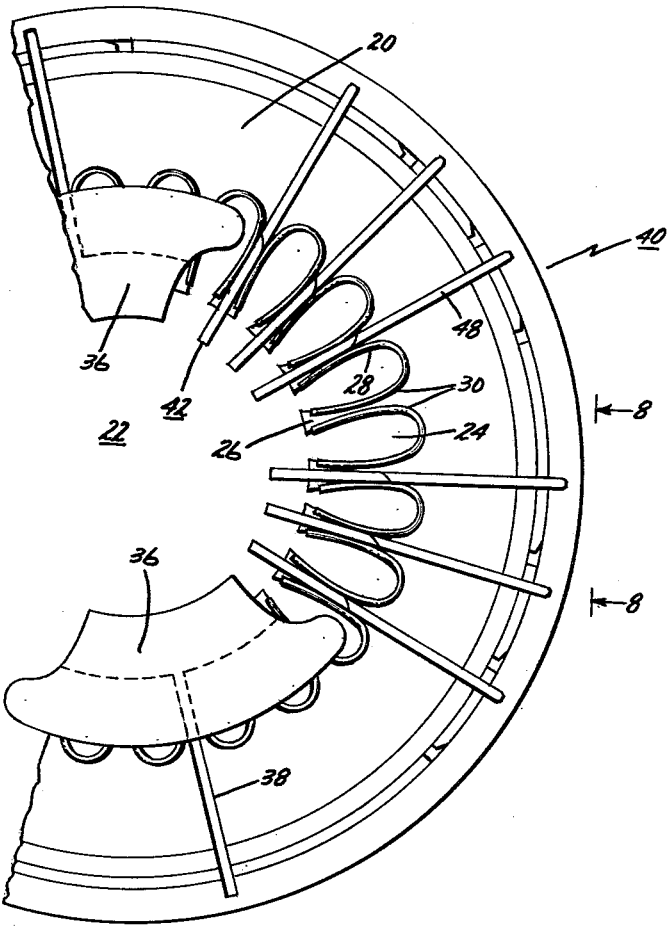
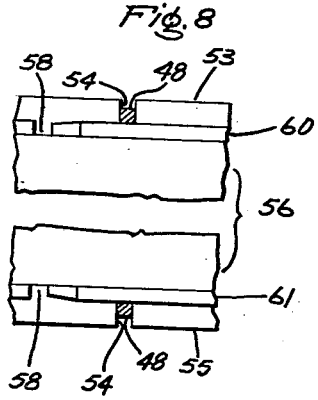
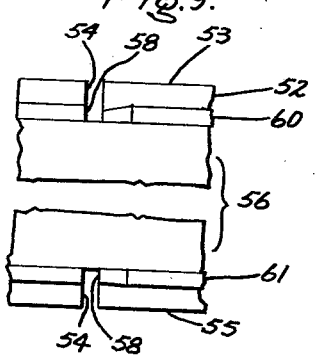
Inventor:
Robert J. Eminger,
by Hood, Gust + Irish
Attorneys.

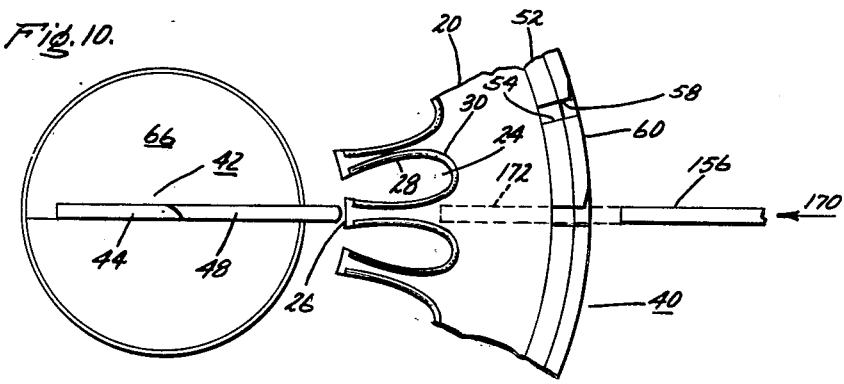
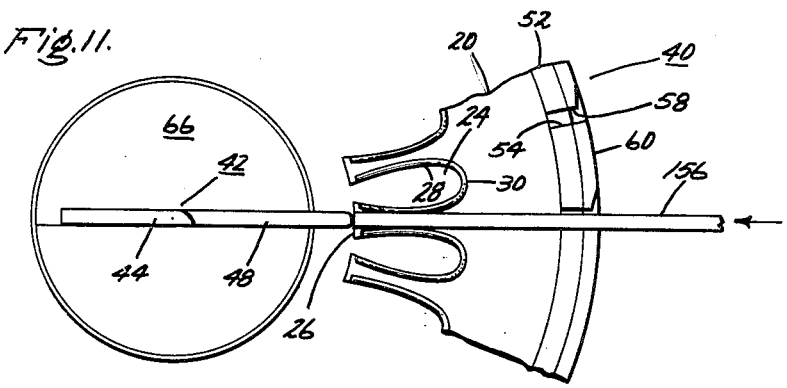
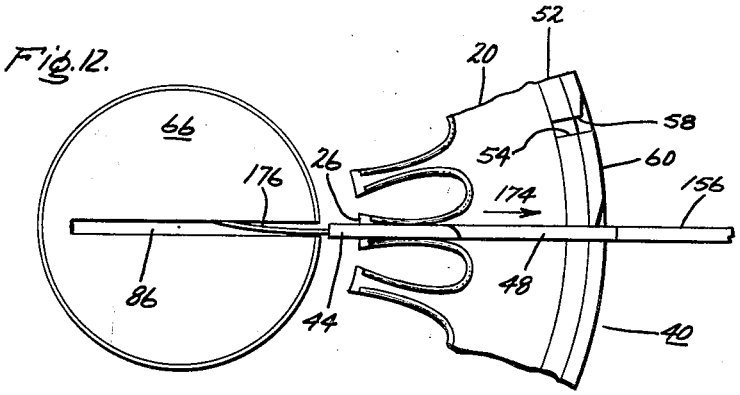

United States Patent Office 3,131,465
Patented May 5, 1964

3,131,465
SHROUD LOADING APPARATUS
Robert J. Eminger, Fort Wayne, Ind., assignor to Fort Wayne Tool & Die, Inc., Fort Wayne, Ind.
Filed Apr. 16, 1962, Ser. No. 187,622
9 Claims. (Cl. 29—205)

This invention relates generally to apparatus for winding distributed field windings on internally slotted dynamo-electric machine stator core members, and more particularly to apparatus for assembling or loading winding shrouds on such cores preparatory to winding.

In the winding of distributed-wound dynamo-electric machine stator core members employing reciprocating winding apparatus of the type shown in my Patent No. 2,949,789, assigned to the assignee of the present application, it is common practice to employ winding shrouds for forming the end turns of the windings on the opposite end faces of the score. Such winding shrouds conventionally comprise enlarged end portions disposed on either side of the core for forming the end turns, a connecting portion joining the end portions and extending through the bore of the core, and a pair of tongues extending radially outwardly from the connecting portion across the opposite end faces of the core, the tongues being engaged by a clamping ring which surrounds the core for holding the shrouds in assembled relation on the core. When each pole of the core being wound is formed of two or more concentric windings, an inner or main shroud is conventionally provided for forming the end turns of the innermost coil, which may span five pole pieces or teeth for example, and segmental shrouds are respectively provided disposed on either side of the main shroud for forming the end turns of the outer coils. Such segmental shrouds are conventionally transversely thinner than the width of one pole piece or tooth, and are disposed in radial alignment with a respective pole piece.

Prior to winding a distributed-wound stator core member, slot insulators or liners are conventionally positioned in the winding slots of the core, such insulators commonly having cuffed portions which extend outwardly on both end faces of the core. In the particular case of a stator core member for a two-pole, single phase, alternating current motor having a large number of winding slots, such as 36, the pole pieces or teeth respectively intermediate the winding slots are narrow in width and thus the cuffs of the slot insulators of adjacent slots will be closely adjacent or even directly abutting along at least a part of the length of the intermediate pole piece. The slot insulators are commonly formed of kraft paper or other relatively stiff sheet insulating material and thus insertion of the tongues of a segmental shroud between the insulator cuffs of adjacent slots may be difficult and may also result in tearing of the cuffs. Furthermore, in the case of a stator core member for a two-pole single phase motor having 36 winding slots and a relatively small diameter bore, a total of two main or inner shrouds and twelve segmental shrouds are required and insertion by hand of all of the shrouds through the bore is extremely difficult if not impossible by virtue of the small available space. It is therefore desirable to provide apparatus for assembling segmental shrouds on an internally slotted stator core member which eliminates the above-mentioned difficulties encountered in manually inserting such segmental shrouds on core members having narrow pole pieces.

It is accordingly an object of the invention to provide apparatus for assembling winding shrouds on internally slotted dynamo-electric machine stator core members.

Another object of the invention is to provide apparatus for assembling segmental winding shrouds on internally slotted stator core members, the shrouds being of the type which are narrower than one stator pole piece and respectively have a pair of spaced parallel elongated tongues extending therefrom adapted respectively to extend radially across opposite end faces of the core for clamping the shroud to the core.

A further object of the invention is to provide apparatus for assembling segmental winding shrouds on an internally slotted stator core member of the type having pole pieces which are narrow in width and slot insulators in adjacent slots respectively having cuffs at each end which are closely adjacent along at least a part of the pole piece, and wherein the winding shroud is of the type having elongated tongues which must be inserted between the cuffs of adjacent slot insulators during assembly.

Further objects and advantages of the invention will become apparent by reference to the following description and the accompanying drawing, and the features of novelty which characterize the invention will be pointed out with particularity in the claims annexed to and forming a part of the specification.

The invention in its broader aspects provides a member adapted to be inserted in the bore of the core, the member having a cavity therein communicating with its outer surface for receiving a winding shroud and means for ejecting the winding shroud from the cavity. Movable follower means are provided having a pair of elongated fingers respectively in alignment with the tongues of the shroud when the shroud is in the cavity, the follower means being radially movable inwardly to a position in which the ends of the fingers respectively engage the ends of the tongues, the follower means being radially movable outwardly by engagement of the tongues and the fingers respectively responsive to ejection of the shroud from the cavity.

In the drawing:
FIG. 1 is a side cross-sectional view of the shroud assembling apparatus of the invention;
FIG. 2 is a top view of the apparatus of FIG. 1;
FIG. 3 is a fragmentary cross-sectional view taken along the line 3—3 of FIG. 2;
FIG. 4 is a fragmentary cross-sectional view taken along the line 4—4 of FIG. 1;
FIG. 5 is a fragmentary side cross-sectional view similar to FIG. 1 but showing the shroud positioned in the cavity of the loading member prior to its assembly on the stator core;
FIG. 6 is a fragmentary cross-sectional view of a stator core member showing a slot insulator positioned in a winding slot and a segmental shroud assembled thereon;
FIG. 7 is a fragmentary top view of a stator core member showing the main and segmental winding shrouds assembled thereon;

FIG. 8 is a fragmentary side view taken along the line 8—8 of FIG. 7;

FIG. 9 is a fragmentary side view, similar to FIG. 8, but showing the shroud locking ring in position for assembly of the shroud; and FIGS. 10, 11 and 12 are fragmentary top views illustrating the assembly of a segmental winding shroud on a stator core member with the apparatus of the invention.

Figure 1:
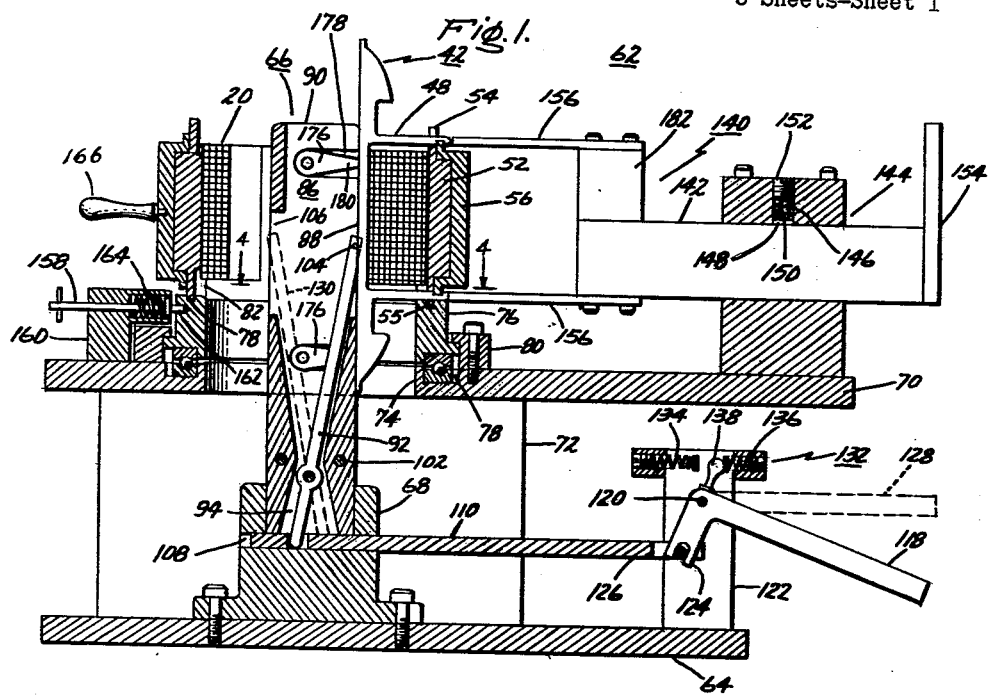
Figure 4:
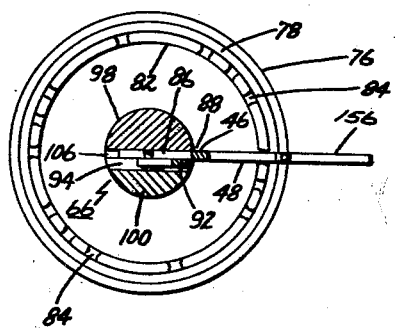

Referring now briefly to FIGS. 6 through 9 inclusive, there is shown a stator core member 20 for a two-pole, single-phase, alternating current dynamo-electric machine, the core 20 having a bore 22 with a plurality of winding slots 24, shown here as being thirty-six (36) in number, extending radially outwardly therefrom and respectively defining pole pieces or teeth 26 therebetween. Each of the winding slots 24 has a slot insulator 28 seated therein, the insulators 28 respectively having cuff portions 30 extending beyond the respective slot 24 on the opposite end faces 32 and 34 of the core. It will be seen that by virtue of the relatively narrow transverse width of the pole pieces 26, the cuffs 30 of adjacent slot insulators 28 are closely adjacent or abutting along a part of the radial length of each pole piece 26.

A pair of main winding shrouds 36 are provided each having tongues 38 extending radially outwardly across the opposite end faces 32, 34 of core 20 and are respectively engaged by locking ring assembly 40. Shroud members 36 are conventional and need not be further described.

A plurality of segmental shroud members 42 are provided each comprising enlarged end portions 44 and a connecting portion 46 joining the end portions and abutting the end of a respective pole piece 26. Each of the segmental shrouds 42 has a pair of spaced parallel tongues 48 extending outwardly from connecting portion 46 and having a notch 50 formed adjacent its outer end. It will be observed that each of the segmental shrouds 42 is transversely thinner than the width of the respective pole piece 26 at its narrowest point and that the segmental shrouds 42 are assembled with the tongues 48 extending radially outwardly across the opposite end faces 32, 34 of core 20 between the cuffs 30 of the slot insulators 28 in the adjacent slots.

Locking ring assembly 40 comprises an inner ring 52 having radial slots 54 formed in its top and bottom edges 53 and 55 through which the tongues 48 of the segmental shrouds 42 and the tongues 38 of the main shrouds 36 respectively extend, and an outer movable ring 56 having radial notches 58 formed in upper and lower clamping portions 60, 61. Rings 56 and 52 are initially positioned as shown in FIG. 9 with notches 54 and 58 in radial alignment to permit insertion of tongues 38 and 48 of shrouds 36 and 42 respectively, following which ring 56 is rotated so that clamping portions 60, 61 engage notches 50 as shown in FIG. 8; it will be understood that tongues 38 of shrouds 36 are provided with notches 50 for engagement with clamping portions 60, 61 of the outer ring 56. Following assembly of the main shrouds 36 and the segmental shrouds 42 on the core 20 and clamping of their tongues 38, 48, by locking ring assembly 40, the resulting assembly of core, shrouds and locking ring is positioned in a winding machine, such as that shown in the aforementioned Patent No. 2,949,789, and the concentric windings are then wound as is well known to those skilled in the art.

Referring now to FIGS. 1 through 5 inclusive, in which like elements are indicated by like reference numerals, the shroud loading or assembly apparatus of the invention, generally indicated at 62, comprises a horizontally disposed base plate member 64 adapted to be mounted on a suitable work bench or stand. An elongated cylindrical arbor 66 is provided having its lower end secured to base plate 64 by means of flange 68 and extending vertically upwardly therefrom, as shown.

An upper supporting plate 70 is provided in spaced parallel relationship above base plate 64 and mounted thereon by means of side frame members 72. An opening 74 is provided in plate 70 through which arbor 66 coaxially extends. An annular stator-supporting ring 76 coaxially surrounds arbor 66 and is rotatably supported on plate 70 by means of suitable anti-friction bearings 78. An annular guide ring 80 is secured to plate 70 and cooperates with ring 76 to hold the same in assembled relation, as show. The upper edge of ring 76 has an annular groove 78 formed therein which receives the lower flange 55 of ring 52 of locking ring assembly 40. Ring 76 has upwardly extending inner flange 82 formed thereon which supports core 20, groove 78 and flange 82 cooperating to support and locate core 20 coaxially surrounding arbor 66 with its bore 22 radially spaced therefrom, as shown. Flange 82 on ring 76 has a plurality of radial grooves 84 formed therein respectively in alignment with grooves 54 in the lower flange 55 of locking ring 52 for accommodating tongues 38, 48 of the shrouds 36, 42 as will be hereinafter more fully described.

Arbor 66 has an elongated, vertically and radially extending slot-like cavity 86 formed therein communicating with the outer cylindrical surface of arbor 66, as at 88, and also with the upper end of arbor 66, as at 90. As best seen in FIG. 5, cavity 86 is proportioned to receive one of the segmental shrouds 42 inserted or dropped therein from the top through opening 90 with the tongues 48 extending radially outwardly toward core 20 in planes respectively spaced from the end faces 32, 34 of the core, but with the ends of the tongues 48 terminating short of the surface of bore 22 of the core 20.

A shroud-ejecting lever member 92 is provided extending generally vertically in another cavity 94 in arbor 66 which communicates with cavity 86, as best seen in FIG. 3, lever member 92 being pivotally mounted by means of a pivot pin 96, as shown. Arbor 66 is preferably formed of two halves 98 and 100 with the slot-like cavity 86 being formed in half 98 and the other cavity 94 being formed in the half 100, the two halves being held in assembled relation by means of suitable threaded fasteners 102.

Lever member 92 has a pin 104 secured at its upper end and extending into cavity 86, pin 104 engaging the inner edge of connecting portion 46 of a segmetal shroud 42 thereby to eject the shroud from the cavity 86, as will be hereinafter more fully described.

Cavity 86 in arbor 66 has as another opening 106 communicating between its outer cylindrical surface, and cavity 86 diametrically opposite from opening 88 in order to accommodate the upper end of lever 92 when in its position shown in FIG. 5 with a shroud 42 positioned in the cavity 86.

A transverse slot 108 is formed in flange 68 communicating with cavity 94 and arbor 66 and an elongated actuating member 110 is slidingly seated in slot 108 and extends therefrom as shown. An opening 112 is formed in the end of actuating member 110 within slot 108 and receives the lower end 114 of ejecting lever 92. It will now be seen that movement of actuating member 110 in the direction shown by the arrow 116 in FIG. 5 will pivot shroud ejecting lever 92 from its position as shown in FIG. 5 to its position as shown in FIG. 1 thereby to eject the segmental shroud 42 from the cavity 86.

Actuating member 110 is operated by means of a suitable manually-actuated lever 118 pivotally mounted, as at 120 on a bracket 122 which is secured to base plate 64, lever 118 having its end 124 connected to the outer end 126 of actuating member 110 by a suitable slot and pin connection, as shown. Lever 118 is manually actuated to the position shown in solid lines to eject a shroud and to the position shown in dashed lines 128 in FIG. 1, thereby positioning shroud ejecting lever 92 as shown in dashed lines 130 in FIG. 1 and as shown in FIG. 5 to permit insertion of a shroud in cavity 86. A centering device 132 mounted on bracket 122 comprises springs 134 and 136 which cooperate with a suitable pin 138 on the lever member 118 in order normally to position lever 118 midway between the positions shown.

A follower assembly 140 is provided comprising a radially movable bar member 142 slidingly supported in a bearing block assembly 144 for radial in and out movement with respect to the axis of arbor 66. Bearing block 144 has an opening 146 formed therein in which is seated a friction pad 148 which bears on the upper surface of bar 142, a spring 150 and a threaded plug 152 which cooperate to exert restraining friction on the bar 142. The follower assembly 140 is manually moved radially inwardly and outwardly by means of a suitable handle 154 secured to the end of the bar member 142.

Secured to the bar member 142 is a pair of vertically spaced parallel fingers 156 which are respectively in radial alignment with the cavity 86 in arbor 66 and with tongues 48 of a segmental shroud 42 when the same is positioned in the cavity 86; fingers 156 have the same vertical spacing as tongues 48 and substantially the same transverse thickness.

The support ring 76 is indexed to predetermined rotational positions in order to permit assembly of segmental shrouds 42 on the desired pole pieces 26 of core 20 by means of a manually actuated index pin 158 mounted in a bracket member 160 carried on plate member 70 and biased into engagement with suitable index holes 162 in ring 78 by means of spring 164. Locking ring 56 of clamping assembly 40 is rotated from its position shown in FIG. 9 to its tongue-locking position as shown in FIG. 8 by means of a suitable handle 166.

Referring additionally to FIGS. 10, 11 and 12, in the operation of the shroud loading apparatus of the invention, clamping ring assembly 40 is assembled on core 20 in which slot insulators 28 have already been positioned, and handle 166 is manipulated to rotate locking ring 56 so that the radial notches 54 in inner ring 52 and 58 in clamping ring 56 are in alignment, as shown in FIG. 9. The main shrouds 36 are then assembled on the core and this assembly is then positioned on the support ring 76, i.e., with lower flange 55 of inner ring 52 of the clamping ring assembly 40 seated in annular groove 78 of the support ring 76. Index pin 158 is then withdrawn and support ring 76 with the core and clamping ring assembly thereon is then rotated manually to the proper radial position for loading of the first segmental shroud 42, following which index pin 158 is released to enter an appropriate opening 162 in the support ring 76.

Recalling that lever 118 will be in its normal position midway between the position shown, lever 118 is actuated to the position shown in dashed lines 128 in FIG. 1 so that the ejecting lever 92 is moved to the position shown in dashed lines 130 in FIG. 1 and as shown in solid lines in FIG. 5. A segmental shroud 42 is then dropped into the top opening 90 of slot 86 in arbor 66. Bar 142 is then moved radially inwardly by means of handle 154 thereby moving fingers 156 radially inwardly in the direction shown by the arrow 170 through respective notches 54, 58 in the upper and lower edges 53, 55 of inner ring 52 and locking ring 56 of clamping ring assembly 40. As the fingers 156 move radially inwardly, as shown in dashed lines 172 in FIG. 10, it will be seen that they are in alignment with a particular pole piece 26 and that they enter the space between the cuffs 30 of adjacent slot insulators 28 from the outside thereby permitting the fingers 156 to separate the cuffs 30 without tearing, as shown in FIG. 11. The radial inward movement 170 of fingers 156 is continued until their ends respectively abut the ends of tongues 48 of the segmental shroud 42 as shown in FIGS. 5 and 11.

At this point, handle 118 is actuated to its position shown in solid lines in FIG. 1 thereby pivoting ejecting lever 92 to its position shown in FIG. 1 and ejecting the shroud 42 radially outwardly from the slot 86 into a position with the connecting portion 46 in engagement with the end of the particular tooth 26, as shown in FIGS. 1, 6 and 12. This radial outward movement of the tongues 48 of the segmental shroud 42, as shown by the arrow 174, pushes the fingers 156 of the follower assembly 140 radially outwardly and thus follows them between the already separated cuffs 30 of the adjacent slot insulators 28, thus again preventing tearing of the cuffs. It will be seen that in the final assembled position of the segmental shroud 42, the ends of the tongues 48 now extend through the aligned slots 54, 58 in the upper and lower edges 53, 55 respectively of the inner ring 52 and in the locking ring 56 of the clamping ring assembly 40.

In order to eliminate any tendency for the segmental shroud 42 which has just been ejected from slot 86 in ardor 66 to move backward or radially inwardly following return of handle 118 and ejecting lever 92 to their normal positions 128, 130 respectively under the influence of the resilience of cuffs 30, leaf springs 176 are provided seated in recesses 178 in the wall of cavity 86 on the side thereof remote from cavity 94. These leaf springs 176 do not interfere with insertion of a segmental shroud 42 in cavity 86, as shown in FIG. 5, and when the shroud is ejected radially outwardly from the cavity, the connecting portion 46 of the shroud biases the free ends 180 of the springs 176 into the recesses 178. It will be seen in FIGS. 1, 2 and 12, that when the segmental shroud 42 has been completely ejected from the slot 86 and into assembled position on the core 20, the free ends 180 of the leaf springs 176 engage the inner edge of connecting portion 46 of the shroud 42 thus preventing it from partially reentering the cavity 86 and thus permitting indexing of the core and shroud assembly to the position for loading the next segmental shroud.

Following assembly of the first segmental shroud 42 as above described, the index pin 158 is withdrawn and the core, clamping ring and shroud assembly then manually rotated to the position for loading the next segmental shroud following which the index pin 158 is released to enter the next index opening 162 in the support ring 76. Another segmental shroud 42 is then inserted in the cavity 86 of arbor 66 and loaded on the core as above described.

When all of the segmental shrouds are loaded on the core 20, handle 166 is then manipulated to rotate locking ring 56 of clamping ring assembly 40 to cause the upper and lower flanges 60, 61 of the locking ring 56 to enter the notches 50 in the tongues 48 and 38 thereby securing the shrouds 36, 42 in assembled relation on the core 20. The core, clamping ring and shroud assembly are then removed from the loading apparatus and assembled on the winding machine for winding the coils, as is well-known to those skilled in the art.

It will be readily understood that in order to accommodate cores of different stack height, the rings 52 and 56 of clamping ring assembly 40 may be formed in two parts with suitable spacers interposed therebetween, and the member 182 which supports the upper finger 156 may be mounted on bar 142 for vertical adjustment thereby to adjust the vertical spacing between the fingers 156.

It will be seen that I have provided apparatus in the nature of a fixture whereby a plurality of segmental winding shrouds may be expeditiously loaded or assembled on an internally slotted core member. The apparatus of the invention substantially reduces the time required for loading segmental shrouds on core members which previously could have been loaded by hand, and further the apparatus now permits the loading of segmental shroud members on stator cores having narrow pole pieces with closely adjacent slot insulator cuffs and with relatively small diameter bores where hand assembly of the segmental shrouds was difficult or impossible.

While I have described above the principles of my invention in connection with specific apparatus, it is to be clearly understood that this description is made only by way of example and not as a limitation to the scope of my invention.

What is claimed is:

1. Apparatus for assembling segmental winding shrouds on an internally slotted stator core, wherein said shrouds are of the type which are narrower than one stator pole piece respectively and have a pair of spaced parallel elongated tongues extending therefrom adapted respectively to extend radially across opposite end faces of said core when said shroud is assembled thereon, said apparatus comprising: a supporting frame; a member on said frame and adapted to be coaxially inserted in the bore of said core, said member having means for receiving a winding shroud therein and locating said shroud with said tongues extending radially outwardly in planes respectively on either side of said end faces and parallel therewith; means for moving said shroud radially outwardly from said receiving means whereby said tongues respectively move radially outwardly across said end faces; movable follower means radially spaced from said member and having a pair of elongated fingers spaced apart in a plane lying in the axis of said member, said fingers respectively extending radially toward said axis whereby said fingers are respectively in radial alignment with said shroud tongues when said shroud is in said receiving means; and means on said frame supporting said follower means for radial movement toward and away from said member whereby said follower means is selectively radially movable toward said member to a position in which the ends of said fingers respectively engage the ends of said tongues when said shroud is in said receiving means and said follower means is radially movable outwardly by engagement of said tongues and said fingers respectively responsive to said movement of said shroud from said receiving means.

2. Apparatus for assembling segmental winding shrouds on an internally slotted stator core, wherein said shrouds are of the type which are narrower than one stator pole piece respectively and have a pair of spaced parallel elongated tongues extending therefrom adapted respectively to extend radially across opposite end faces of said core when said shroud is assembled thereon, said apparatus comprising: a supporting frame; an elongated member on said frame and having means including an axially elongated radially extending cavity formed therein communicating with its outer surface for receiving a shroud therein and supporting the same with said tongues extending radially toward said outer surface and normal to the axis of said member; means on said frame for supporting a core coaxially surrounding said elongated member with said tongues lying in planes respectively on either side of said end faces and parallel therewith; means in said cavity for ejecting said shroud radially therefrom whereby said tongues respectively move radially outwardly across said end faces; a follower member radially spaced from said elongated member and having a pair of elongated fingers extending therefrom, said fingers being spaced apart and parallel in a plane lying in the axis of said member; means on said frame and spaced from said core supporting means and said elongated member for supporting said follower member for radial movement with respect to the axes of said elongated member and with said fingers respectively extending radially inwardly toward and in alignment with said cavity whereby said fingers are respectively in radial alignment with said tongues when said shroud is in said cavity, said follower member being selectively radially movable toward said cavity to a position in which said fingers respectively extend radially across said opposite end faces of said core and the ends of said fingers respectively engage the ends of such tongues when said shroud is in said cavity, said follower member being radially movable outwardly away from said cavity by engagement of said tongues and fingers respectively responsive to ejection of said shroud from said cavity.

3. The apparatus of claim 2 wherein said ejecting means comprises a lever member pivotally mounted in said cavity and having means on one end for engaging the side of said shroud remote from said core thereby to eject said shroud from said cavity responsive to movement of said lever member, and an actuating member engaging the other end of said lever member for moving the same.

4. The apparatus of claim 2 further comprising means in said cavity adapted to engage said shroud when the same is fully ejected from said cavity thereby to prevent reentry of said shroud into said cavity.

5. The apparatus of claim 2 further comprising means on said frame for rotatably indexing said core supporting means thereby to permit assembly of a plurality of shrouds on said core.

6. Apparatus for assembling segmental winding shrouds on an internally slotted stator core, wherein said shrouds are of the type which are narrower than one stator pole piece respectively and have a pair of spaced parallel elongated tongues extending therefrom adapted respectively to extend radially across opposite end faces of said core when said shroud is assembled thereon, said apparatus comprising: a horizontally disposed supporting frame; an elongated member having one end secured to said frame and extending vertically upwardly therefrom, said elongated member having an elongated radially extending slot-like cavity formed therein communicating with its other end and its outer surface for receiving a shroud therein and supporting the same vertically with said tongues extending radially toward said outer surface; means on said frame for supporting a core coaxially surrounding said elongated member with said tongues lying in planes respectively on either side of said end faces and parallel therewith; a lever member pivotally mounted in said cavity with lower and upper ends respectively extending toward said one and other ends of said elongated member, said upper end of said lever member having means thereon adapted to engage the side of said shroud remote from said core for ejecting said shroud radially from said cavity responsive to movement of said lever whereby said tongues respectively move radially outwardly across said end faces; said elongated member having a transverse slot therein adjacent said one end and communicating with said cavity; an actuating member extending into said slot and engaging the lower end of said lever member for moving the same thereby to eject said shroud from said cavity; a follower member radially spaced from said elongated member and having a pair of elongated fingers extending therefrom, said fingers being spaced-apart and parallel in a plane lying in the axis of said elongated member; means on said frame spaced from said core supporting means, and said elognated member for supporting said follower member for radial movement with respect to the axes of said elongated member and with said fingers respectively extending radially inwardly toward and in alignment with said cavity whereby said fingers are respectively in radial alignment with said tongues when said shroud is in said cavity, said follower member being selectively radially movable inwardly toward said cavity to a position in which said fingers respectively engage the ends of such tongues when said shroud is in said cavity, said follower member being radially movable outwardly away from said cavity by engagement of said tongues and fingers respectively responsive to ejection of said shroud from said cavity.

7. Apparatus for assembling winding shrouds on an internally slotted stator core, said apparatus comprising: a horizontally disposed supporting frame; an elongated member having one end secured to said frame and extending vertically upwardly therefrom, said elongated member having an elongated, radially extending slot-like shroud receiving cavity formed therein communicating with the outer surface and other end thereof; means in said cavity for radially ejecting a shroud therefrom; a follower member having a pair of elongated, vertically spaced, parallel fingers extending radially toward said elongated member and in radial alignment with said cavity;

and means on said frame supporting said follower member for radial movement of said fingers toward and away from said elongated member.

8. The apparatus of claim 7 wherein said ejecting means comprises an elongated lever member pivotally mounted in said cavity with one end extending toward said other end of said elongated member and having shroud-engaging means thereon, and actuating means engaging the other end of said lever member for moving the same.

9. The apparatus of claim 7 further comprising means on said frame for rotatably supporting a core coaxially surrounding said elongated member.

References Cited in the file of this patent
UNITED STATES PATENTS

| | | |
|---|---|---|
| 2,873,514 | Mills | Feb. 17, 1959 |
| 2,873,515 | Winstrom | Feb. 17, 1959 |